United States Patent Office 3,215,658
Patented Nov. 2, 1965

3,215,658
AQUEOUS STYRENE AND ACRYLIC POLYMERIC
EMULSIONS PLASTICIZED BY PYRROLIDONES
Americo L. Forchielli, Manchester, Mass., assignor, by
mesne assignments, to Masury-Young Company, Melrose Park, Ill., a corporation of Delaware
No Drawing. Filed Aug. 28, 1961, Ser. No. 136,142
9 Claims. (Cl. 260—29.6)

The present invention is concerned with aqueous polymeric emulsions and, more particularly, with methods for plasticizing such emulsions.

This application is a continuation-in-part of U.S. application Serial No. 7,071, filed February 8, 1960, now abandoned.

One object of the present invention is to provide processes for directly internally plasticizing aqueous polymeric emulsions.

Another object is to provide processes for incorporating organic plasticizers in aqueous polymeric emulsions in such a manner that said plasticizers are present in the micelles of said emulsion.

Still another object is to provide aqueous polymeric emulsions which have been plasticized according to the processes of this invention.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

Generally, when one attempts to add an organic plasticizer, e.g., an organic acid ester, and especially water-insoluble organic plasticizers directly to aqueous polymeric emulsions, the plasticizer tends to form a second dispersed phase. When the emulsions are subsequently cast into films, the films are usually covered with an oil-like surface and are brittle. Moreover, in certain instances the films show poor continuity and low water-resistance. These results indicate that little to no internal plasticizing is taking place.

In the present invention, it has been found that such aqueous polymeric emulsions can be directly plasticized by adding pyrrolidones, and especially water-soluble pyrrolidones thereto. The pyrrolidones may be used alone or in combination with at least a second organic plasticizer. In the latter embodiment, it is believed that the pyrrolidones serve to carry the organic plasticizers through the continuous aqueous phase into the dispersed polymeric micelles. Films, produced from emulsions, plasticized according to this invention, are resilient and have substantially improved continuity and water resistance. Further, they are substantially free of oily surfaces.

The use of pyrrolidones in the polymeric art is not unknown. Such pyrrolidones have been fairly widely known as solvents and modifiers for bulk polymers (polymers in non-emulsion form), e.g., polyacrylonitrile, and have been added in varying amounts to such bulk polymers. Despite this prior use, the pyrrolidones have not been used in aqueous polymeric emulsions, nor is their particular suitability for such emulsions known. When it is considered that in the present invention the pyrrolidones and especially the hydrophilic, water soluble pyrrolidones internally plasticize the hydrophobic or dispersed phase of the emulsion in the presence of the continuous water phase, the results are quite unexpected. The results are even more unexpected in the embodiment wherein the pyrrolidones are used in combination with at least a second organic plasticizer. In this latter embodiment, as pointed out above, the pyrrolidones serve to carry the organic plasticizer through the continuous aqueous phase into the dispersed hydrophobic phase. The fact that the pyrrolidones would act in this manner is beyond the realm of chemical predictability.

The pyrrolidones which have been found particularly useful are the water-soluble pyrrolidones and more particularly the 2-pyrrolidones. Such 2-pyrrolidones may be unsubstituted, as 2-pyrrolidone, i.e.

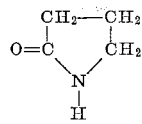

or substituted. As examples of substituents which may be present on the cyclic carbon and nitrogen atoms of the pyrrolidones, mention may be made of phenyl, alkyl, hydroxy, carboxy, amino, alkylamino, halogen, carboxamide acryloxy and carbalkoxy groups. When the substituent is an alkyl, such alkyl may be saturated or unsaturated, e.g., vinyl and is preferably a lower alkyl, e.g., contains less than six carbon atoms. As examples of such 2-pyrrolidones, mention may be made of N-methyl-2-pyrrolidone, N-ethyl-2-pyrrolidone, N - propyl-2-pyrrolidone, N-isopropyl-2-pyrrolidone, N-butyl-2-pyrrolidone, N-vinyl-2-pyrrolidone, 2-pyrrolidone-5-carboxylic acid, 3,3-dimethyl-2-pyrrolidone-5-carboxylic acid, 3,3,5 - trimethyl-2-pyrrolidone-5-carboxylic acid, the lower alkyl esters of such carboxylic acids, eg., 5-carbopropoxy-2-pyrrolidone (i.e., propyl ester of 2-pyrrolidone-5-carboxylic acid), 5-carbethoxy-3,3-dimethyl-2-pyrrolidone, 5-carbomethoxy-3,3,-5-trimethyl-2-pyrrolidone, N - phenyl-pyrrolidone, 3-hydroxy-2-pyrrolidone, 4-hydroxy-2-pyrrolidone, 3-acetoxy-2-pyrrolidone, 4-acetoxy-2-pyrrolidone, 5-methyl-2-pyrrolidone, 3,3-dimethyl-2-pyrrolidone, 3,3,5-trimethyl-2-pyrrolidone, 1,5-dimethyl-2-pyrrolidone, $N^5$-methyl-2-pyrrolidone-5-carboxamide, $N^5,N^5$-dimethyl-2-pyrrolidone-5-carboxamide, $N^5$-ethyl-N-vinyl - 2-pyrrolidone, 3,3-dimethyl-N-vinyl-2-pyrrolidone, 3-methyl-N-vinyl-2-pyrrolidone, 3-ethyl-N-vinyl-2 - pyrrolidone, 4 - methyl - N - vinyl - 2 - pyrrolidone and 4 - ethyl-N-vinyl-2-pyrrolidone.

A preferred class of pyrrolidones are those which may be represented by the following formula:

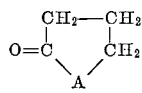

wherein A is selected from the group consisting of NH, N—CH=CH$_2$ and N-alkyl group. When A is an N- alkyl group, the alkyl substituent is preferably a lower alkyl, e.g., it contains less than six carbon atoms.

The term "aqueous emulsion" as used herein, is intended in the broad sense and includes embodiments wherein liquid polymers as well as solid polymers of various particle sizes are dispersed or suspended in an aqueous medium. The term "polymeric" is similarly used in the broad sense to refer to polymers and resins, in general, and is particularly intended to include addition polymers prepared from a single monomer (i.e., homopolymers) as well as polymers prepared from two or more monomers. As examples of monomers which can be used alone or in combination to make such addition polymers mention may be made of olefin hydrocarbons, e.g., ethylene, propylene, isobutylene, butene-1, cis-butene-2, pentene-1, butadiene, etc., acrylyl and alkacrylyl compounds, e.g., acrylic haloacrylic, methacrylic, ethacrylic, etc., acids, esters, nitriles and amides, for example, acrylonitrile, methyl methacrylate, methyl ethacrylate, ethyl methacrylate, butyl methacrylate, octyl methacrylate, cyclohexyl methacrylate, alkyl acrylates, such as ethyl acrylate, methoxymethyl methacrylate, n - butoxyethyl methacrylate; aminoalkyl methacrylates, such as β-diethylaminoethyl methacrylate, chloroethyl methacrylate, methacrylic acid, methacrylamide, and α-chloroacrylic acid; styrenes including substituted styrenes such, for example, as α-methylstyrene; nuclear - substituted halostyrenes, e.g., ortho-, meta- and parachloro-, and fluoro- styrenes, dichloro-, difluoro-, trichloro- and trifluoro- styrenes, ortho-, meta- and para- cyano- styrenes, nuclear-substituted alkyl- and cycloalkyl-styrenes, such as mono- and dimethyl- styrenes, mono- and diethyl-styrenes, and para- phenyl- styrenes; divinylbenzene; vinyl carboxylates, e.g., vinyl acetate, vinyl trimethyl acetate, vinyl propionate, vinyl butyrate, vinylhexanoate vinyl laurate, vinyl stearate, vinyl benzoate and vinyl chloracetate; derivatives of the vinyl carboxylates when polymerized, e.g., vinyl alcohol, acetals of vinyl alcohol; vinyl halides, e.g., vinyl chloride; vinyl fluoride, vinylidene chloride, vinylidene fluoride, tetrafluoroethylene, and trifluorochlorethylene; maleic acid and alkyl esters of maleic acid, crotonic acid, glycol and polyglycol di-acrylates and dimethacrylates, alkyl esters of fumaric acid, vinylpyridines, vinyl imides, e.g., N-vinylphthalimide; methyl vinyl ketone; and vinyl ethers, e.g., vinyl ethyl ether and vinyl isobutyl ether.

Especially useful results have been obtained with polystyrene emulsions, acrylic emulsions, styreneacrylic emulsions and other heteropolymer emulsions prepared from major proportions of styrene and/or acrylic monomers and lesser proportions of at least a second polymerizable monomer, e.g., acrylic and alkacrylic acids. The terms "acrylic monomer" and "acrylic emulsions" as used herein are intended in the manner in which they are widely used in the emulsion art to refer to esters of polymerizable α,β-unsaturated carboxylic acids and to the emulsions prepared from such esters. The preferred acrylic emulsions are those prepared from alkyl and especially lower alkyl esters of acrylic and alkacrylic acids. The especially useful alkacrylic acids for use in preparing the esters as well as for copolymerization with such esters are those in which an ethyl or methyl group is substituted on the α-carbon of acrylic acid. As examples of preferred emulsions mention may be made of polystyrene, poly-p-methylstyrene, styrene-methyl acrylate heteropolymers, styrene-ethyl methacrylate heteropolymers, styrene-2-ethyl-hexylacrylate heteropolymers, polymethylacrylate, polyethylacrylate, polybutylacrylate, polymethal methacrylate, polyethyl methacrylate, polymethyl ethacrylate, polyethyl ethacrylate, methyl methacrylate-methyl acrylate heteropolymer, ethyl methacrylate-methylacrylate copolymer, methylacrylate-butyl acrylate copolymer, butyl methacrylate-methyl acrylate copolymer, methyl methacrylate-2-ethyl-hexyl-acrylate; and heteropolymers prepared from a major portion of one or more of butyl methacrylate, methyl methacrylate, 2-ethyl-hexyl acrylate, butylacrylate, ethylacrylate, methyl acrylate and styrene with acrylic and methacrylic acid.

The amount of pyrrolidones added to the emulsions may be varied to suit particular needs. Generally, about 0.1 to 67 parts by weight of the pyrrolidones to 33 to 99.9 parts by weight of the dry polymers has been found especially useful. The effect of varying amounts of the pyrrolidone on the films is set forth in the following table:

| Parts of polymer solids | Parts of 2-pyrrolidone | Film property |
| --- | --- | --- |
| 100 | 0 | Brittle; dusts. |
| 99 | 1 | Not brittle; no dusting. |
| 90 | 10 | Do. |
| 78 | 22 | Do. |
| 74 | 26 | Begins softening. |
| 65 | 35 | Very soft. |
| 50 | 50 | Do. |
| 40 | 60 | Do. |
| 33 | 67 | Do. |

From the above table, it should be clear that when hard films are desired, less than about 25 parts of pyrrolidone per 100 parts of plasticized polymer is preferred. In embodiments wherein a softer film is desired, it would be desirable to use greater amounts of pyrrolidone.

As pointed out above, the pyrrolidones may be used alone or in combination with at least a second organic plasticizer. Such second plasticizers may be selected from the various water soluble and water insoluble plasticizers customarily employed. The effectiveness of the pyrrolidones is especially noticeable when the second plasticizer is water insoluble. As examples of compounds useful as second plasticizers, mention may be made of diethylene glycol diacetate, diacetin, tricresyl phosphate, butyl, phthalyl butyl glycolate, methyl phthalyl ethyl glycol, trimethylene glycol di-2-ethyl hexoate, trimethylene glycol di-2-ethyl butyrate and tributoxyethyl phosphate. Especially useful results have been obtained when the second plasticizer is an ester of an organic acid. As examples of such esters, mention may be made of dibutyl phthalate, dioctyl phthalate, dioctyl sebacate, dibutyl sebacate dioctyl adipate, etc.

The emulsions for use in this invention may be prepared by various methods. Generally, they will be prepared by polymerizing one or more monomers in an aqueous system using a surface active agent, e.g., an emulsifier and a polymerization catalyst, e.g., a peroxide.

The pyrrolidones may be incorporated in the aqueous polymeric emulsions by simply adding them to the emulsion system with stirring. When the pyrrolidones are used in combination with at least a second organic plasticizer, the second plasticizer is preferably first added to the pyrrolidone and then the combination of the two plasticizers is added to the emulsion with stirring.

The following non-limiting examples illustrate the preparation of polymeric emulsions within the scope of the present invention:

Example 1

1.561 gm. of 2-pyrrolidone were added with stirring to 29.314 gm. of Ubatol 2001 (trade name of Union Bay State Chemical Co., Inc., Cambridge 42, Mass., for an aqueous polystyrene emulsion having about 36% total solids). The resulting film showed substantial improvement in continuity and water resistance. Moreover, it was free of embrittlement and was found to withstand abrasive action without dusting and chalking.

Example 2

The procedure of Example 1 was repeated except that 1.56 gm. of 2-pyrrolidone was added to 70 gm. of the Ubatol 2001. The resulting film showed the improvements set forth in Example 1.

Example 3

The procedure of Example 1 was again repeated except that 1.0 gm. of 2-pyrrolidone was added to 95.0 gm. of the Ubatol 2001. The resulting film showed improvements similar to those set forth in Example 1.

Example 4

1 gm. of dibutyl phthalate was added to 3 gm. of 2-pyrrolidone and the combination was added with stirring to 40.0 gm. of Ubatol 2001. The resulting film showed improvements similar to those set forth in Example 1.

Example 5

1.0 gm. of dibutyl phthalate was added to 1.0 gm. of 2-pyrrolidone and the combination was added to 5.00 gm. solids (27.8 gm. of emulsion) of Ubatol 3025 (a methyl acrylate homopolymer emulsion comprising 18% solids made by Union Bay State Chemical Co.). The resulting film showed that it was internally plasticized.

Example 6

2 gm. of N-methyl pyrrolidone were added to 100 gm. of a polyvinyl acetate homopolymer emulsion comprising 18% total solids. The resulting film exhibited in addition to good continuity increased water-resistance.

Example 7

An emulsion was prepared as in Example 6 except that 2-pyrrolidone was used in place of the N-methylpyrrolidone. The resulting film also showed improved water-resistance in addition to good continuity.

Example 8

Emulsions were prepared as in Examples 6 and 7 except that 1 gm. of dibutyl phthalate was added in addition to the pyrrolidones. The resulting films were free from oiliness thus indicating that the pyrrolidones were acting as couplers in this instance.

Example 9

1.0 gm. of dibutyl phthalate was added to 2.0 gms. of 2-pyrrolidone and the combination was added to 100 gms. of a 20% solids Resyn 3600 emulsion (trade name of a polymer emulsion comprising vinylidene chloride made by National Starch and Chemical Co.). The resulting film as in Example 8 was free of oiliness.

Example 10

3.0 gms. of N-methylpyrrolidone were added to 100 gms. of a 20% solids Geon 352 emulsion (trade name of B. F. Goodrich Co. for a polymeric emulsion comprising vinylchloride). The resulting film showed substantial improvement in continuity and water-resistance from the unplasticized films.

Example 11

An emulsion was prepared as in Example 10 except that 3.0 gms. of N-vinylpyrrolidone was used in place of the N-methylpyrrolidone. The resulting film showed improvements similar to those set forth in Example 10.

When 1 gm. of dibutyl phthalate was used in combination with the pyrrolidones in Examples 10 and 11, the pyrrolidones also acted as a coupler for said dibutyl phthalate.

Example 12

Three separate 100 gms. portions of a styrene-butadiene emulsion, having 20% solids were respectively plasticized with (a) 1 gm. of dibutyl phthalate in 2 gms. of 2-pyrrolidone; (b) 1 gm. of dibutyl phthalate in 2 gms. of N-methylpyrrolidone; and (c) 1 gm. of dibutyl phthalate in 2 gms. of N-vinylpyrrolidone. The resulting films cast from these emulsion, were substantially free of oiliness, thus exhibiting that the pyrrolidones were acting as couplers.

Example 13

Two 100 gms. portions of a butadiene-acrylonitrile copolymer emulsion, having 20% solids, were respectively plasticized with (a) 1 gm. of dibutyl phthalate in 2 gms. of N-methylpyrrolidone, and (b) 1 gm. of dibutyl phthalate in 2 gms. of 2-pyrrolidone. The films, cast from the emulsions, were free of oiliness as in Example 12.

Example 14

Three emulsions were prepared as in Example 12, except an ethylacrylate-N-vinylpyrrolidone copolymer emulsion was used in place of the butadiene-styrene emulsion. The resulting films were substantially free of oiliness.

Example 15

2.0 gms. of 2-pyrrolidone were added to 100 gms. of a styrene-N-vinylpyrrolidone copolymer emulsion (20% solids). The resulting film showed improved continuity from the unplasticized film.

Example 16

1 gm. of dibutylphthalate was placed in 2 gms. of N-vinylpyrrolidone and the combination was added to 100 gms. of a 20% solids styrene-acrylic acid copolymer emulsion. The resulting film was free of oiliness and showed improved continuity.

Example 17

An emulsion was prepared as in Example 16 except that a styrene-acrylonitrile emulsion was used in place of the styrene-acrylic acid emulsion. The resulting film showed similar improvement as that in Example 16 and was free of oiliness.

Example 18

Three emulsions were prepared as in Example 12, except that a dimethylitaconate-styrene-acrylonitrile, 2-ethyl-hexylacrylate-itaconic acid, heteropolymer emulsion was used in place of the styrene-butadiene emulsion. The resulting films showed improved continuity over the unplasticized films and were free of oiliness.

Example 19

Three emulsions were prepared as in Example 12, except that a vinylpyrrolidone-itaconic acid-acrylic acid-methacrylic acid heteropolymer emulsion was used in place of the styrene-butadiene emulsion.

The emulsions plasticized according to this invention are useful in various film-forming compositions such, for example, as floor polishes, paints, etc. It should be understood that when desired various other reagents such, for example, as pigments, waxes, leveling agents, etc., may be added to the emulsions.

Since certain changes may be made in the above products and processes without departing from the scope of the invention herein involved, it is intended that all matter contained in the above description shall be interpreted as illustrative and not in a limiting sense.

I claim:

1. A composition of matter comprising an aqueous polymeric emulsion containing as its polymeric constituent a polymer selected from the group consisting of homopolymers of styrene, acrylic homopolymers, and copolymers prepared from a major portion of at least one monomer selected from the group consisting of styrene and acrylic monomers and lesser proportions of at least a second polymerizable monomer, and a water-soluble 2-pyrrolidone, the 2-pyrrolidone added to the emulsion in about 0.1 to 67 parts by weight of the pyrrolidone to 33 to 99.9 parts by weight of the dry polymer.

2. A composition as defined in claim 1 which also comprises at least a second water-insoluble organic plasticizer.

3. A composition as defined in claim 2 wherein said second plasticizer is an organic acid ester plasticizer.

4. A composition as defined in claim 1 wherein said water-soluble 2-pyrrolidone is selected from the group of 2-pyrrolidones within the formula:

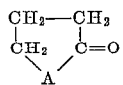

wherein: A represents a member selected from the group consisting of NH, N—CH=CH$_2$ and N-alkyl groups wherein the alkyl contains less than six carbon atoms.

5. A composition as defined in claim 1 wherein said emulsion is a polystyrene emulsion.

6. A composition as defined in claim 1 wherein said emulsion is an acrylic emulsion.

7. A composition as defined in claim 1 wherein said emulsion is a styrene-acrylic emulsion.

8. A composition as defined in claim 1 wherein said emulsion is an emulsion prepared from a major portion of at least one monomer selected from the group consisting of styrene and acrylic monomers and lesser portions of at least a second polymerizable monomer.

9. A composition as defined in claim 8 wherein said second polymerizable monomer is selected from the group consisting of acrylic and alkacrylic acids.

References Cited by the Examiner

UNITED STATES PATENTS

| 2,339,056 | 1/44 | Craver | 260—30.2 XR |
| 2,686,764 | 8/54 | Geister et al. | 260—29.6 XR |
| 3,033,813 | 5/62 | Werner | 260—30.2 XR |

FOREIGN PATENTS

| 64,059 | 10/45 | Denmark. |
| 520,406 | 1/56 | Canada. |

LEON J. BERCOVITZ, *Primary Examiner.*